(12) United States Patent
Deane

(10) Patent No.: US 7,522,247 B2
(45) Date of Patent: Apr. 21, 2009

(54) ACTIVE MATRIX DISPLAY

(75) Inventor: Steven C. Deane, Redhill (GB)

(73) Assignee: Chi Mei Optoelectronics Corporation, Tainan (TW)

( * ) Notice: Subject to any disclaimer, the term of this patent is extended or adjusted under 35 U.S.C. 154(b) by 66 days.

(21) Appl. No.: 10/564,328

(22) PCT Filed: Jul. 7, 2004

(86) PCT No.: PCT/IB2004/002247

§ 371 (c)(1),
(2), (4) Date: Jan. 10, 2006

(87) PCT Pub. No.: WO2005/006287

PCT Pub. Date: Jan. 20, 2005

(65) Prior Publication Data

US 2006/0176436 A1    Aug. 10, 2006

(30) Foreign Application Priority Data

Jul. 15, 2003    (GB) ................................. 0316481.1

(51) Int. Cl.
*G02F 1/1345* (2006.01)
(52) U.S. Cl. ...................................... 349/149; 349/111
(58) Field of Classification Search ................. 349/149
See application file for complete search history.

(56) References Cited

U.S. PATENT DOCUMENTS

| | | | |
|---|---|---|---|
| 5,467,210 A | 11/1995 | Kishigami | |
| 6,567,064 B1 | 5/2003 | Song et al. | |
| 6,624,868 B1 * | 9/2003 | Terukina et al. | 349/149 |
| 2003/0076451 A1 * | 4/2003 | Hector et al. | 349/43 |
| 2003/0117359 A1 | 6/2003 | Park | |
| 2003/0141807 A1 * | 7/2003 | Kawase | 313/498 |
| 2005/0225690 A1 * | 10/2005 | Battersby | 349/41 |

FOREIGN PATENT DOCUMENTS

| | | |
|---|---|---|
| JP | 2000 241827 | 9/2000 |
| WO | WO 02061837 A2 | 8/2002 |

* cited by examiner

*Primary Examiner*—Frank G Font
*Assistant Examiner*—Eric Wong
(74) *Attorney, Agent, or Firm*—Fish & Richardson P.C.

(57) ABSTRACT

An active matrix display is provided with conductor lines extending along edges of the display over the display substrate but outside the display area. These conductor lines include at least one layer which is additional to the thin film layers defining the array of pixels. Row driver circuitry and/or column driver circuitry has a portion provided on the common substrate outside the display area and which connects to the conductor lines. A dedicated process may be used for the conductor lines in order to form low resistance lines. These assist in the integration or mounting of row or column driver circuits onto the common substrate.

19 Claims, 4 Drawing Sheets

ACTIVE MATRIX DISPLAY

The invention relates to active matrix displays.

Active matrix liquid crystal displays (AMLCDs) are one well known example of active matrix display. In such displays, an active plate and a passive plate sandwich a liquid crystal. The active plate includes a number of electrodes for applying electric fields to the liquid crystal and the electrodes are generally arranged in an array. Row and column electrodes extend along the rows and columns of pixel electrodes, and are used to provide data signals to the pixels by means of thin film drive transistors which drive respective pixel electrodes.

In addition to a drive transistor, each pixel may also include a capacitor for maintaining charge on the pixel.

One difficulty is in providing the necessary circuits for decoding incoming signals and driving the row and column electrodes. Generally, such driver circuits are arranged around the outside the pixel array. This enables the pixel array to be formed on a glass substrate, and the row and column driver circuitry to be formed using integrated circuits on a dedicated printed circuit board or other carrier—for example foil.

There is currently much interest in the use of low temperature polysilicon (LTPS) or microcrystalline silicon to integrate some of the functions of a driver IC onto the glass of an AMLCD. Integration helps save some of the IC cost and can also make the display more compact. For example, the integration onto the substrate of the digital to analogue converters (DACs) used in the column driver circuitry has been considered, as well as the row driver circuits.

An alternative proposal is to mount the row driver chips on the edge of the display, thereby maintaining an integrated circuit but avoiding the need for a separate PCB or foil carrier.

However, whilst these approaches avoid the need for a dedicated row driver PCB, they give rise to increased resistance connections (metal tracks on the glass substrate) compared to connections on a PCB. These increased resistances can give rise to visually perceptible artefacts.

According to the invention there is provided an active matrix display, comprising:

an array of pixels provided over a common substrate, each pixel comprising a display element and a switching device, and the array of pixels defining a display area and the pixels being formed from a plurality of thin film layers;

column driver circuitry for providing signals to the pixels for driving the display elements; and row driver circuitry for providing signals to the pixels for controlling the switching devices of the pixels, wherein the display further comprises at least one conductor line extending along an edge of the display over the common substrate and outside the display area, the at least one conductor line comprising at least one layer additional to the plurality of thin film layers defining the array of pixels, and wherein at least one of the row driver circuitry and the column driver circuitry comprises a portion provided on the common substrate outside the display area and which connects to the at least one conductor line.

In this device, an additional conductor line is formed after the formation of the pixel array. This means a dedicated process can be used, in order to form a low resistance line, and to which low resistance connections can be made. These assist in the integration or mounting of row or column driver circuits onto the common substrate.

The row driver circuitry and/or the column driver circuitry can have an integrated circuit (chip) mounted on the substrate and connecting to the low resistance line or lines.

One or more of the conductor lines can be parallel to a side edge of the display, and row driver circuitry can then connect to this line or lines. In addition or instead, one or more of the conductor lines can be parallel to a top/bottom edge of the display, and column driver circuitry can then connect to this line or lines.

The column driver circuitry may further comprises a column driver printed circuit board which connects to a column driver integrated circuit mounted on the substrate. The column driver PCB then provides the interface of the substrate to the other display electronics, and a separate row driver PCB can be avoided.

The at least one conductor line can be a plated line formed over a support defined by one or more of the plurality of thin film layers, or a printed line.

The low resistance lines can for example be used to carry a power supply line voltage, or a clock signal line. Furthermore, in an arrangement in which each pixel has a storage capacitor connected between the display element and a common storage capacitor line, the low resistance line can carry the storage capacitor line voltage.

The invention also provides a method of fabricating an active matrix display, comprising:

forming an array of pixels over a common substrate within a display area of the substrate, each pixel comprising a display element and a switching device, subsequently forming at least one conductor line extending along an edge of the display over the common substrate and outside the display area; and connecting row driver circuitry or column driver circuitry to the at least one conductor line.

For a better understanding of the invention, embodiments will now be described, purely by way of example, with reference to the accompanying drawings in which.

It should be noted that none of the Figures are to scale. Like or corresponding components are generally given the same reference numeral in different Figures.

Figure 1:
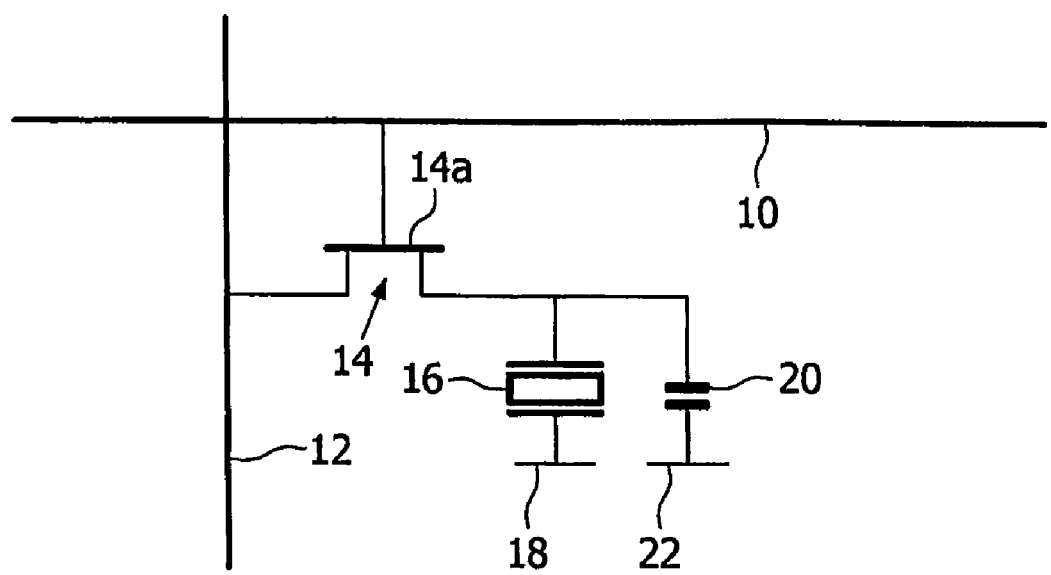
FIG. 1 shows a known liquid crystal pixel circuit.

FIG. 1 shows a conventional pixel configuration for an active matrix liquid crystal display. The display is arranged as an array of pixels in rows and columns. Each row of pixels shares a common row conductor 10, and each column of pixels shares a common column conductor 12. Each pixel comprises a thin film transistor 14 and a liquid crystal cell 16 arranged in series between the column conductor 12 and a common electrode 18. The transistor 14 is switched on and off by a signal provided on the row conductor 10. The row conductor 10 is thus connected to the gate 14a of each transistor 14 of the associated row of pixels. Each pixel additionally comprises a storage capacitor 20 which is connected at one end 22 to the next row electrode, to the preceding row electrode, or to a separate capacitor electrode. This capacitor 20 stores a drive voltage so that a signal is maintained across the liquid crystal cell 16 even after the transistor 14 has been turned off.

In order to drive the liquid crystal cell 16 to a desired voltage to obtain a required grey level, an appropriate analogue signal is provided on the column conductor 12 in synchronism with a row address pulse on the row conductor 10. This row address pulse turns on the thin film transistor 14, thereby allowing the column conductor 12 to charge the liquid crystal cell 16 to the desired voltage, and also to charge the storage capacitor 20 to the same voltage. At the end of the row address pulse, the transistor 14 is turned off, and the storage capacitor 20 maintains a voltage across the cell 16 when other rows are being addressed. The storage capacitor 20 reduces the effect of liquid crystal leakage and reduces the percentage variation in the pixel capacitance caused by the voltage dependency of the liquid crystal cell capacitance.

The rows are addressed sequentially so that all rows are addressed in one frame period, and refreshed in subsequent frame periods.

Figure 2:
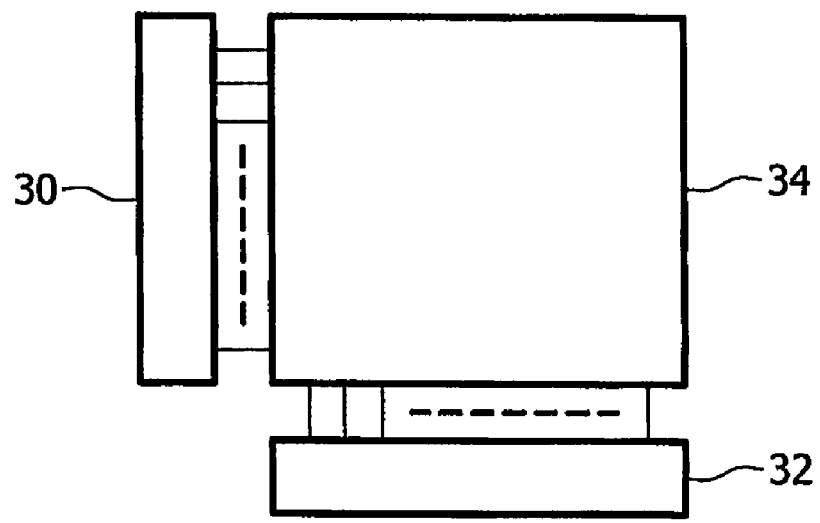
FIG. 2 shows the general components of a liquid crystal display.

As shown in FIG. 2, the row address signals are provided by row driver circuitry 30, and the pixel drive signals are provided by column address circuitry 32, to the array 34 of display pixels. The row address circuitry essentially includes timing circuitry, and the column address circuitry essentially includes digital to analogue converters (DACs) for converting a digital control signal, for example a 6 bit control signal, into an appropriate analogue level for driving a column conductor 12 associated with the DAC.

Figure 3:
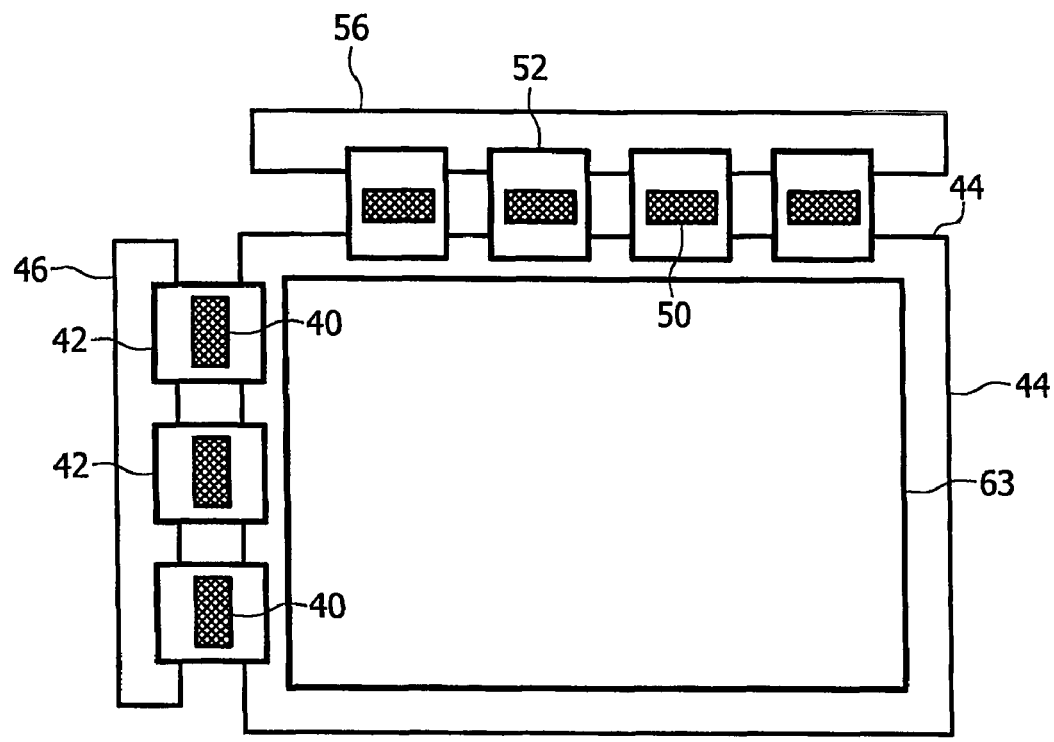
FIG. 3 shows a conventional arrangement of row and column driver circuits.

FIG. 3 shows a conventional arrangement of row and column driver circuits. The row driver circuitry comprises a number of row driver chips 40, each mounted on their own support 42, which can be a flexible foil carrying copper conductive tracks. The flexible foil can be bent over so that the components lie along the edge of the display substrate and therefore do not significantly increase the footprint of the display module. The foils 42 have arrays of connection points which connect to the display substrate 44 (in particular to the row conductors) and to a row printed circuit board 46 which carries other components. Similarly, the column driver circuitry comprises a number of column driver chips 50, each mounted on their own flexible foil 52. The foils 52 also have arrays of connection points which connect to the display substrate 44 (in particular to the column conductors) and to a column printed circuit board 56 which carries other components. Of course the chips 40,50 may be mounted on the PCBs with banks of (flexible) connectors between the display substrate and the PCBs 46,56.

The copper tracks on the flexible foils provide good connections between the row and column driver chips and the display substrate as well as between the row and column driver chips and the PCBs.

There have been various proposed architectures which enable at least part of the row and/or column driver circuitry to be formed on the same substrate as the pixel array. This can eliminate the need for a separate PCB for the row and/or for the column.

One possibility is to make integrated circuits on the glass substrate using the same thin film technology as used to form the pixel array. Another possibility is to mount the row driver chips on the edge of the display. However, the high resistance of the metal tracks on the glass substrate is a limitation, particularly for large displays.

Figure 4:
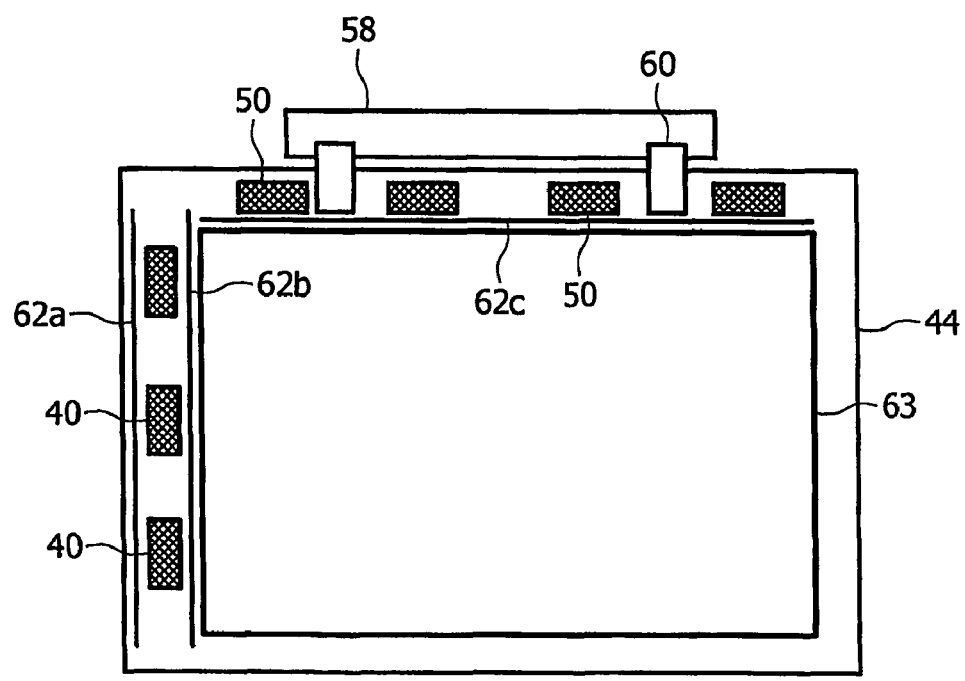
FIG. 4 shows an arrangement of row and column driver circuits in accordance with the invention.

FIG. 4 shows an arrangement of row and column driver circuits in accordance with the invention. The row and column driver chips 40, 50 are mounted on the display substrate 44. This makes it possible to avoid completely the need for a row driver PCB. As shown in FIG. 4, the column driver may still use a simplified column driver PCB 58 with connectors 60 to the display substrate 44.

In order to overcome the problems of high resistance connections on the glass substrate, one or more conductor lines 62a,62b are provided extending along one or more edges of the display, over the common substrate and outside the display area 63.

In the example shown, two conductor lines 62a, 62b are shown at one side edge of the display adjacent the row driver chips 40, and one conductor line 62c is shown at a top side edge of the display adjacent the column driver chips 50. These conductors provide low resistance interconnections, and are added by plating or printing techniques after the thin film fabrication process, so that they do not complicate or raise the cost of the array fabrication process.

In this way, these additional conductor lines have a printed or plated layer which is additional to the plurality of thin film layers defining the array of pixels. One or more of the thin film layers may, however, combine with the printed or plated layer to define the low resistance additional conductor lines. The additional conductor line or lines are formed after the formation of the pixel array. This means a dedicated process can be used, in order to form low resistance lines, and to which low resistance connections can be made. These assist in the integration of row or column driver circuits onto the common substrate.

The low resistance conductor line or lines can be plated over a suitably patterned one of the thin film layers of the pixel array or may be printed.

By way of example, the low resistance lines can be used to carry a power supply line voltage, a clock signal line, and/or the common storage capacitor line (reference 22 in FIG. 1).

The invention can be applied to many different types of liquid crystal display. By way of one example only, a field shielded pixel design will be described below. In this type of pixel configuration, the pixel electrodes overlap the row and column conductors 10,12, so that there is no gap between the row and column conductors and the pixel electrodes, which would otherwise need to be shielded. This results in a high aperture pixel.

Figure 5:
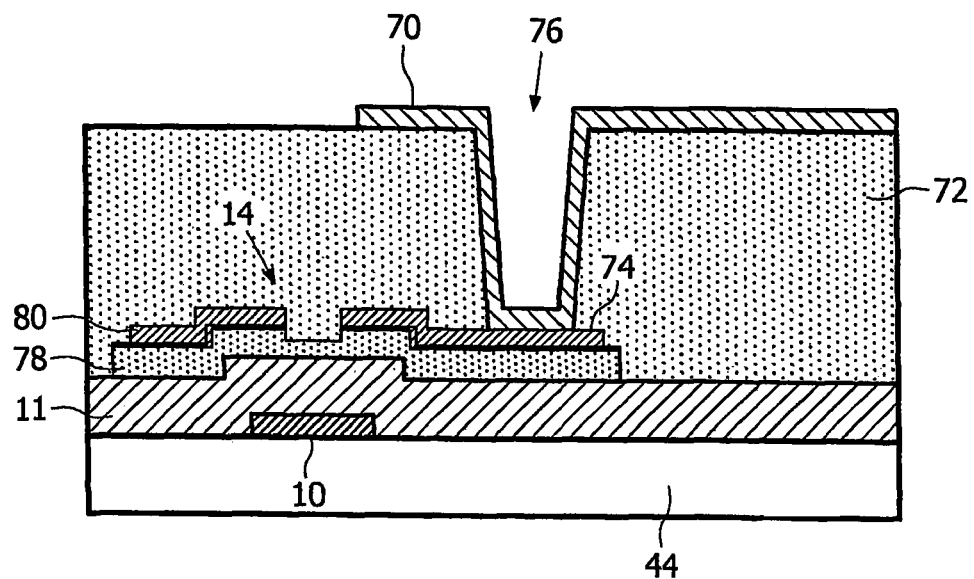
FIG. 5 shows an example of thin film layers used in the display of the invention.

FIG. 5 shows a cross-section through the TFT 14 of a FSP panel, in which a back channel etch (BCE) bottom gate TFT is used as the active matrix switching device.

The pixel electrode 70 overlaps the row conductor as shown in FIG. 5 and also overlaps the column conductor 12 (not seen in FIG. 5). The metal row and column conductors 10, 12 block the passage of light. The pixel electrode 70 is provided over a polymer layer 72 and contacts the drain 74 of the TFT 14 through a via 76 in the polymer layer 72.

A bottom gate TFT 14 is shown in FIG. 5, and comprises a metal gate which is integral with the row conductor 10. A gate dielectric layer 11 overlies the gate, on top of which is formed the silicon (amorphous or polycrystalline) transistor body 78. The source and drain 80,74 are defined by a top metal layer integral with the column conductors 12.

Figure 6:
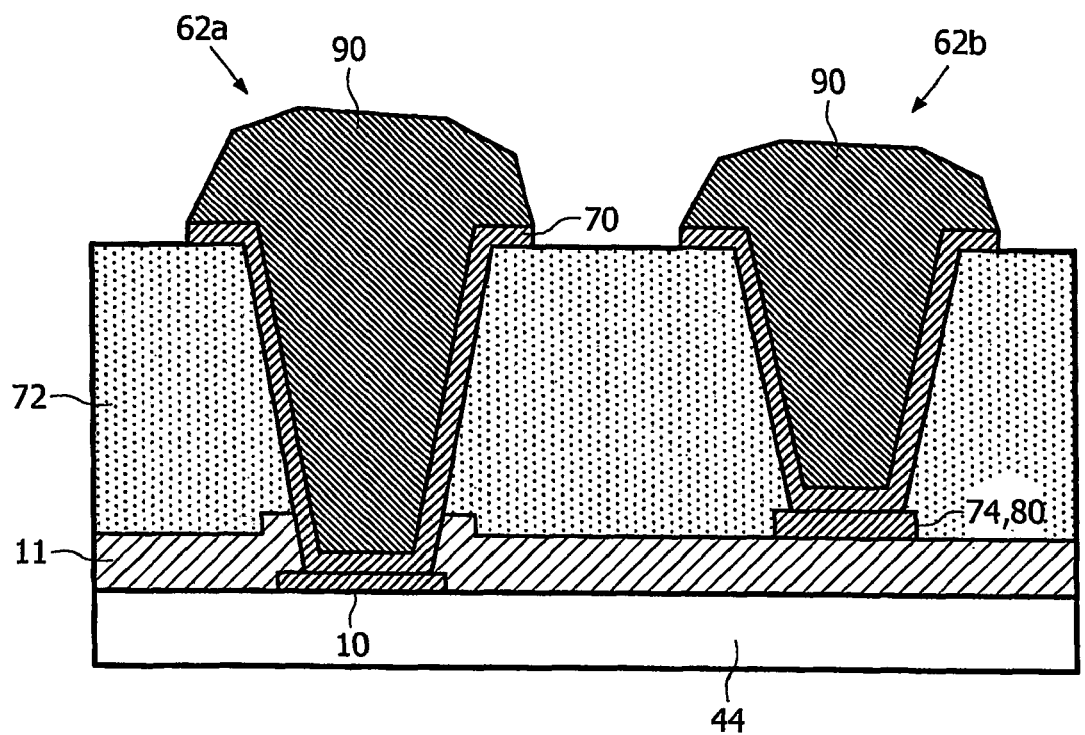
FIG. 6 shows in cross section an example of the layers used in the active matrix array.

There are many other different pixel designs, and further details will not be given in this application. By way of example, FIG. 6 shows how the thin film layers of FIG. 5 can be patterned to enable the low resistance lines to be formed outside the display area using plating.

The low resistance line 62a is formed on an area of the ITO pixel electrode layer 70 which extends down to the row/gate electrode layer 10. In this area of the substrate, none of the other TFT layers are formed.

The low resistance line 62b is also formed on an area of the ITO pixel electrode layer 70, but which extends down to the metal drain/source and column electrode layer 74,80. In this area of the substrate, the drain source layer can be formed directly over the gate dielectric 11, although if the processing of the TFT layers does not allow this (without introducing additional mask steps) the other transistor layers can remain beneath the layer 74,80.

In both cases, the ITO well acts as the plating electrode, so that a large low resistance plating area 90 can be formed. The width of the top of the ITO pad is selected to define the desired width of the low resistance line, and the depth is controlled by the plating process. The chip pads can be bonded directly onto a plated area. The plating metal will typically be copper.

The low resistance line 62b FIG. 6 allows the row conductors to pass beneath (not shown in FIG. 6) so that the row chips can still make contact to the row conductors in conventional way, through a series of vias.

Plating into a via as shown in FIG. 6 allows connection to be made to the underlying row or column conductors. If this is not required, for example if the low resistance line is for the power supply to the row or column driver chips, then an ITO line may be formed on top of the polymer layer 72, and no via is then required. This ITO line is then plated in the same way as shown in FIG. 6.

The etching of the polymer layer 72 can be performed in a single step for both lines, using an etchant which stops when a metal layer is reached. This can of course be the same process used for forming the well 76 used to connect the ITO pixel electrode to the TFT drain. Thus, the support for the plating operation can be formed using the normal TFT processes required for the manufacture of the TFT array.

The low resistance lines are typically not for carrying the row signals, but are instead for the power supply line, clock signals or common electrode connections.

Figure 7:
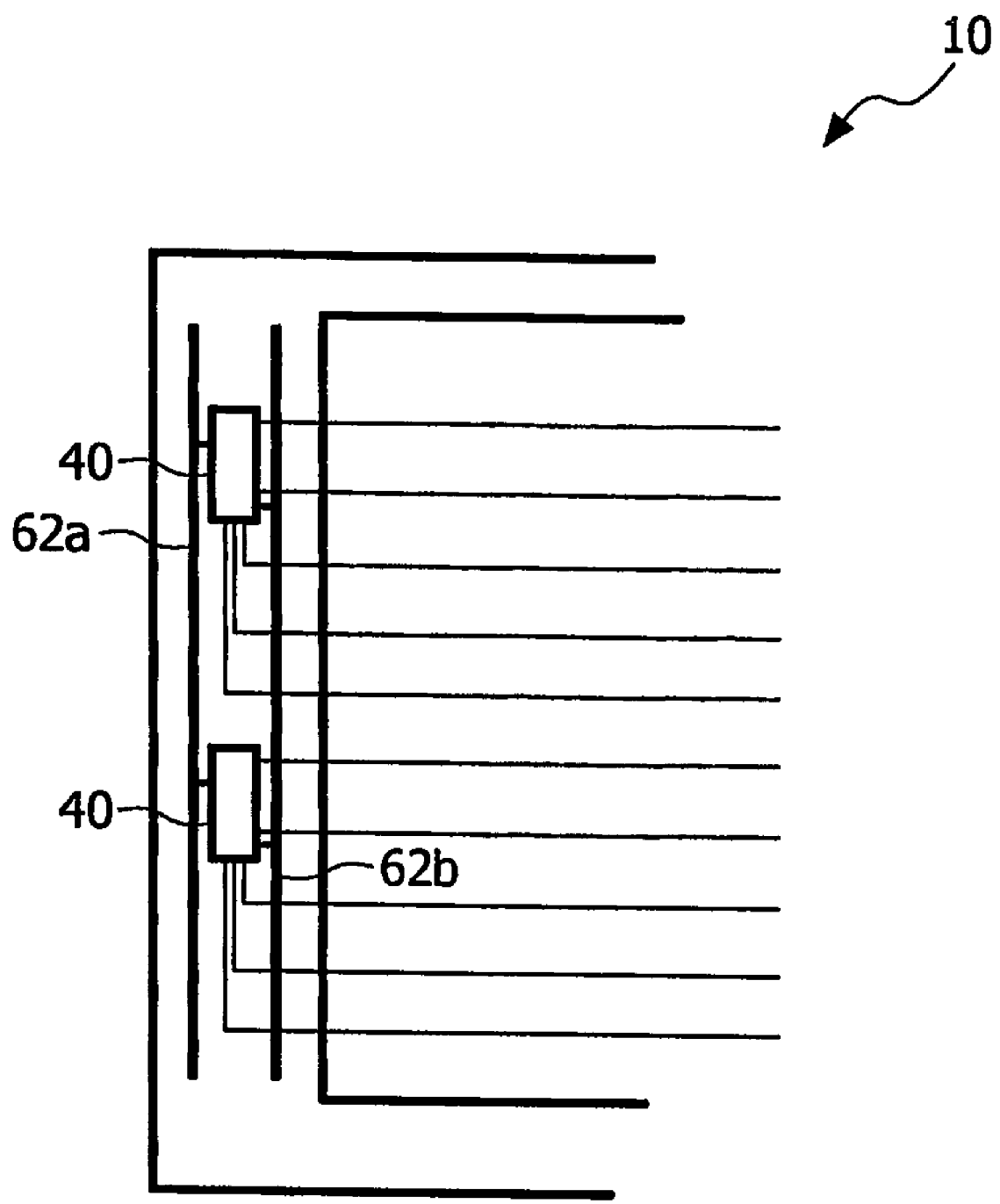
FIG. 7 shows how the layers of FIG. 6 can be used to implement the invention.

FIG. 7 shows a simplified arrangement of two row driver chips 40. By way of example, each chip 40 can receive a clock signal to one of its connection pads from the line 62a, and a power supply from the line 62b. The chips are mounted directly over spurs from the lines 62a and 62b. The row conductors pass beneath the line 62b (as shown in FIG. 6) and connect to the chip in same way that the conventional foils connect to the row conductors.

The same principles can be used for the connection to the low resistance line 62c, and this will not be described in further detail.

The use of printing avoids the need for a metal support as required when plating, as described above. This printing may therefore be carried out directly over the layer 72.

In the examples above, row and column driver chips are shown mounted on the display substrate. However, the invention can be used when part of the row or column driver circuitry is formed from the thin film layers of the pixel array. The additional conductors can then overlie this circuitry to provide low resistance interconnections. Thus, the invention in general provides that at least a portion of the row and/or column driver circuitry is provided on the common substrate outside the display area, which connects to the low resistance conductor line, and this portion may for example be an integrated circuit (chip) and/or other components.

The low resistance line or lines can be formed after the active matrix substrate has been formed but before cell manufacture, or else after cell manufacture (namely after assembly of the top and bottom substrates between which the liquid crystal layer is sandwiched). If the lines are added after cell manufacture, then a wide range of processes can be used, as compatibility with the cell making process is not required.

As mentioned above, the low resistance lines can be formed by plating or printing, but other processes may also be used. A suitable plating process could be electro-deposition or electroless deposition of additional metal onto a metal support structure on the edge of the active plate. This support structure could use the metal layer of the row conductors and/or of the column conductors, as shown above. The row conductor is typically around 300 nm thick, and this could be plated with a thick, 5-20 micron, copper layer by dipping the edge of the completed cell into a copper plating bath. The copper will selectively plate onto the existing conductors, so that no additional patterning process is needed. Furthermore, the plating process can be carried out on many plates at a time in a batch process.

A passivating layer can be provided over the low resistance lines to protect the metals from subsequent corrosion, and this could be applied after IC chips are mounted on the glass substrate.

A printing process could be inkjet printing of a metal precursor, such as metal nanoparticles in a solvent, which is converted to a conducting film by subsequent heat treatment. Alternatively, a molten metal can be inkjet printed, which solidifies on contact with the substrate.

There are many other ways to form the additional line independently of the thin film deposition processes used to form the active plate, and these will be apparent to those skilled in the art.

Other examples will also be apparent to those skilled in the art.

The invention claimed is:

1. An active matrix display, comprising:
an array of pixels provided over a common substrate each pixel comprising a display element and a switching device and the array of pixels defining a display area and the pixels being formed from a plurality of thin film layers;
column driver circuitry for providing signals to the pixels for driving the display elements; and
row driver circuitry for providing signals to the pixels for controlling the switching devices of the pixels,
wherein the display further comprises at least one conductor line extending along an edge of the display over the common substrate and outside the display area, the at least one conductor line comprising at least one layer additional to the plurality of thin film layers defining the array of pixels, and wherein the row driver circuitry and the column driver circuitry are provided on the common substrate outside the display area and at least one of the row driver circuitry and the column driver circuitry connects to the at least one conductor line through spurs extending from the at least one conductor line, wherein the at least one conductor line extends between the portion and the display area.

2. The display as claimed in claim 1, wherein the at least one of the row driver circuitry and the column driver circuitry comprises an integrated circuit provided on the common substrate outside the display area.

3. The display as claimed in claim 2, wherein the row driver circuitry comprises at least one row driver integrated circuit mounted on the common substrate and wherein the at least one conductor line is parallel to a side edge of the display.

4. The display as claimed in claim 3, wherein the at least one conductor line comprises a plurality of lines parallel to the side edge of the display.

5. The display as claimed in claim 2, wherein the column driver circuitry comprises at least one column driver integrated circuit mounted on the common substrate, and wherein the at least one conductor line is parallel to a top edge of the display.

6. The display as claimed in claim 5, wherein the at least one conductor line comprises a plurality of lines parallel to the top edge of the display.

7. The display as claimed in claim 5, wherein the column driver circuitry further comprises a column driver printed circuit board which connects to the at least one column driver integrated circuit.

8. The display as claimed in claim 1, wherein the at least one conductor line comprises a plated line formed over a support defined by one or more of the plurality of thin film layers.

9. The display as claimed in claim 1, wherein the at least one conductor line comprises a printed line.

10. The display as claimed in claim 1, wherein the at least one conductor line comprises a power supply line.

11. The display as claimed in claim 1, wherein each pixel further comprises a storage capacitor connected between the display element and a common storage capacitor line, and the at least one conductor line comprises the storage capacitor line.

12. The display as claimed in claim 1, wherein the at least one conductor line comprises a clock signal line.

13. A method of fabricating an active matrix display, comprising the acts of:
    forming an array of pixels over a common substrate within a display area of the substrate, each pixel comprising a display element and a switching device;
    subsequently forming at least one conductor line extending along an edge of the display over the common substrate and outside the display area; and
    connecting row driver circuitry or column driver circuitry to the at least one conductor line through spurs extending from the at least one conductor line, wherein the row driver circuitry and the column driver circuitry are provided on the common substrate outside the display area, and wherein the at least one conductor line extends between the portion and the display area.

14. The method as claimed in claim 13, wherein the row driver circuitry or the column driver circuitry comprises an integrated circuit and the connecting act comprises mounting the integrated circuit on the substrate and providing electrical connections to the at least one conductor line.

15. The method as claimed in claim 13, wherein the at least one conductor line is formed by plating over one of layers forming the array of pixels.

16. The method as claimed in claim 15, wherein the plating is over a thin film metal layer used to form row conductors in the pixel array.

17. The method as claimed in claim 13, wherein the at least one conductor line is formed by printing.

18. The display of claim 1, wherein pixel electrodes of the array of pixels overlap at least one of row and column conductors of at least one of the row driver circuitry and the column driver circuitry so that there is no gap between the row and column conductors and the pixel electrodes.

19. The method of claim 13, wherein pixel electrodes of the array of pixels overlap at least one of row and column conductors of at least one of the row driver circuitry and the column driver circuitry so that there is no gap between the row and column conductors and the pixel electrodes.

* * * * *